United States Patent
Muramatsu

(10) Patent No.: US 11,506,792 B2
(45) Date of Patent: Nov. 22, 2022

(54) POSITION DETECTION SYSTEM, SENSOR TERMINAL, AND POSITION DETECTION METHOD

(71) Applicant: FUJITSU LIMITED, Kawasaki (JP)

(72) Inventor: Atsushi Muramatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 16/881,367

(22) Filed: May 22, 2020

(65) Prior Publication Data

US 2020/0379119 A1 Dec. 3, 2020

(30) Foreign Application Priority Data

Jun. 3, 2019 (JP) .............................. JP2019-103649

(51) Int. Cl.
| | | |
|---|---|---|
| *G01S 19/09* | (2010.01) | |
| *G01S 19/24* | (2010.01) | |
| *G01S 19/28* | (2010.01) | |
| *G01S 19/25* | (2010.01) | |
| *G01S 19/26* | (2010.01) | |
| *G01S 19/06* | (2010.01) | |

(52) U.S. Cl.
CPC .............. *G01S 19/09* (2013.01); *G01S 19/06* (2013.01); *G01S 19/246* (2013.01); *G01S 19/254* (2013.01); *G01S 19/26* (2013.01); *G01S 19/28* (2013.01)

(58) Field of Classification Search
CPC ........ G01S 19/09; G01S 19/06; G01S 19/246; G01S 19/254; G01S 19/26; G01S 19/28
USPC ........................................ 342/357.25, 357.64
See application file for complete search history.

(56) References Cited

U.S. PATENT DOCUMENTS

2010/0141523 A1* 6/2010 Riley .................... G01S 19/258
342/357.64

FOREIGN PATENT DOCUMENTS

JP 2002-082157 A 3/2002

\* cited by examiner

*Primary Examiner* — Bo Fan
(74) *Attorney, Agent, or Firm* — ArentFox Schiff LLP

(57) ABSTRACT

A position detection method to be executed by a computer, the position detection method includes transmitting, by a sensor terminal, a signal obtained by performing capture processing on a satellite signal from a satellite of a search target according to an order of the satellites of the search targets; calculating, by a calculation device, a position of the sensor terminal based on a signal transmitted by the sensor terminal; and determining a satellite having a highest discovery probability based on a specific estimation method for second and subsequent search targets, using an index which is reflected larger as the discovery probability of other satellites is higher or lower, in a case where the first satellite is captured when a first search target is determined.

9 Claims, 15 Drawing Sheets

FIG. 11

| SATELLITE | FREQUENCY | TIME → | | | | | | | | | | |
|---|---|---|---|---|---|---|---|---|---|---|---|---|
| SATELLITE 1 | HIGH | ○ | ○ | | | | | | | | | |
| | INTERMEDIATE | | | ○ | ○ | ○ | | | | | | |
| | LOW | | | | | ○ | ○ | ○ | | | | |
| SATELLITE 2 | HIGH | | | | | ○ | ○ | | | | | |
| | INTERMEDIATE | | | | | ○ | ○ | ○ | | | | |
| | LOW | | | | | | | | ○ | ○ | | |

POSITION DETECTION SYSTEM, SENSOR TERMINAL, AND POSITION DETECTION METHOD

CROSS-REFERENCE TO RELATED APPLICATION

This application is based upon and claims the benefit of priority of the prior Japanese Patent Application No. 2019-103649, filed on Jun. 3, 2019, the entire contents of which are incorporated herein by reference.

FIELD

The embodiments discussed herein are related to a position detection system, a sensor terminal, and a position detection method.

BACKGROUND

A technique is disclosed for positioning by using a satellite signal from an artificial satellite. When a plurality of satellites revolve around one orbit, other artificial satellites are not captured even when one artificial satellite is captured. Therefore, there has been disclosed a technic for selecting a satellite of a next search target based on relative position information between each satellite (see, for example, U.S. Patent No. 2010/0141523 and Japanese Laid-open Patent Publication No. 2002-082157). For example, as the related art, U.S. Patent No. 2010/0141523 and Japanese Laid-open Patent Publication No. 2002-082157 are disclosed.

SUMMARY

According to an aspect of the embodiments, a position detection method to be executed by a computer, the position detection method includes transmitting, by a sensor terminal, a signal obtained by performing capture processing on a satellite signal from a satellite of a search target according to an order of the satellites of the search targets; calculating, by a calculation device, a position of the sensor terminal based on a signal transmitted by the sensor terminal; and determining a satellite having a highest discovery probability based on a specific estimation method for second and subsequent search targets, using an index which is reflected larger as the discovery probability of other satellites is higher or lower, in a case where the first satellite is captured when a first search target is determined.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating a frequency range;

DESCRIPTION OF EMBODIMENTS

However, when a satellite of a next search target is selected from relative position information between satellites, there are cases where a search range may not be narrowed down, such as selecting a satellite with a low probability of being captured.

In view of the above, it is desirable to provide a position detection system which is able to narrow down the search range of the satellite, a sensor terminal, and a position detection method.

Hereinafter, examples will be described with reference to the drawings.

EXAMPLE 1

For example, a sensor terminal for receiving a Global Positioning System (GPS), which is a type of a global navigation satellite system (GNSS), consumes a large amount of power and therefore carries a large battery. This configuration hinders miniaturization and weight reduction of the sensor terminal. If a small battery is used, an operable time of the sensor terminal is short. This configuration leads to an increase in maintenance costs due to battery replacement. The consumed power of the sensor terminal for receiving GPS signals is large because a data rate of a satellite signal is as low as 50 bps and an operating time for the sensor terminal to receive the satellite signal is as long as 30 seconds to 12.5 minutes.

As means for solving this problem, a technique called snapshot positioning has been developed. In this technique, the sensor terminal operates only for a short time of about several 10 msec, and a code phase and a Doppler frequency obtained during this time are used to perform a positioning calculation. A method, in which an ephemeris (satellite orbit data) and the like for the positioning calculation are acquired over a network and the positioning calculation is performed over a cloud, has been proposed.

Figure 1:
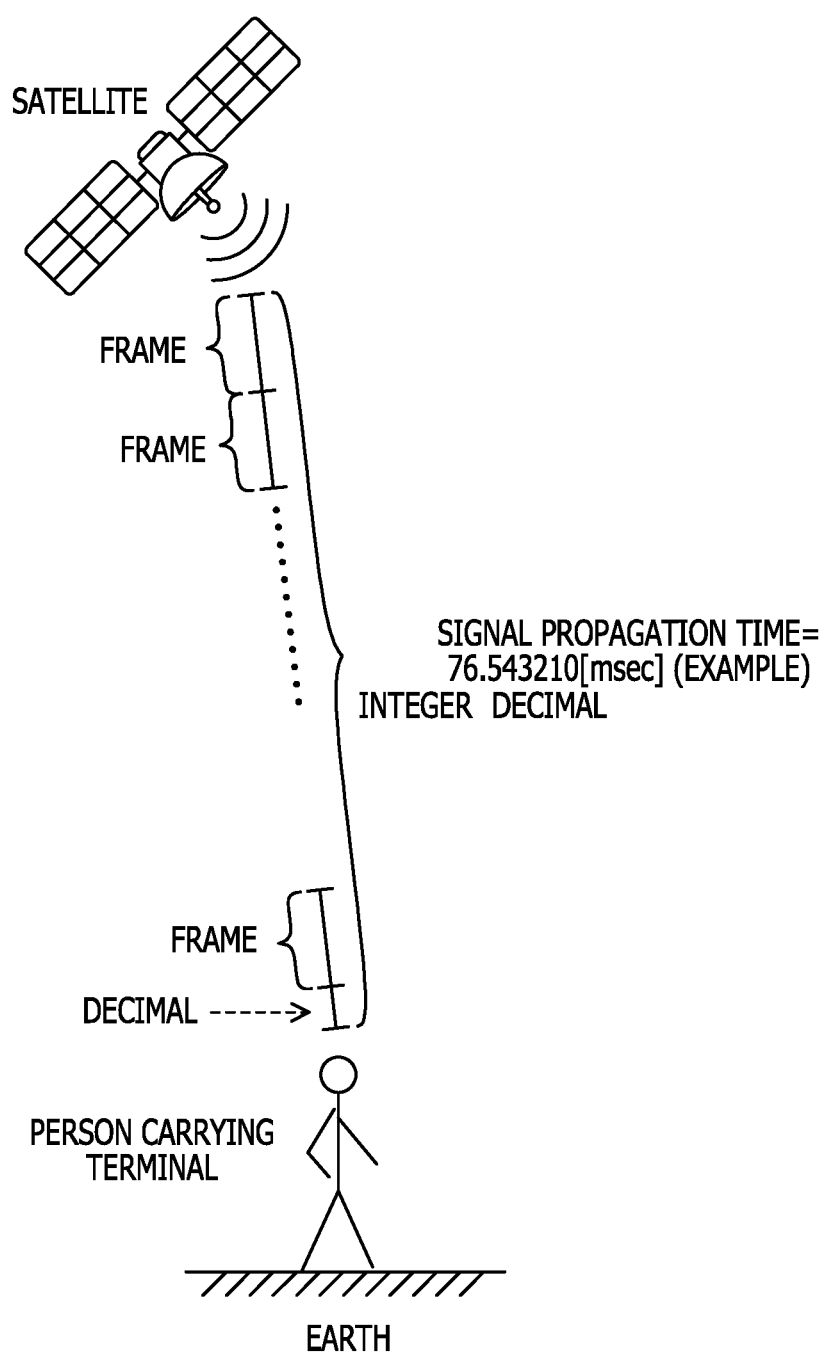
FIG. 1 is a diagram illustrating snapshot reception.

As illustrated in FIG. 1, in the snapshot reception, it is difficult to obtain information of a portion of an integer value, when the unit is millisecond, of a signal propagation time taken from the GNSS satellite to the sensor terminal. If this integer value is not obtained, it is difficult to perform the positioning calculation of the sensor terminal. Therefore, a rough position is narrowed down using the Doppler frequency of a received signal. The position of the sensor terminal may be accurately measured by using a position of a relay device (receiving station) that receives the code phase and the Doppler frequency from the sensor terminal.

Figure 2:
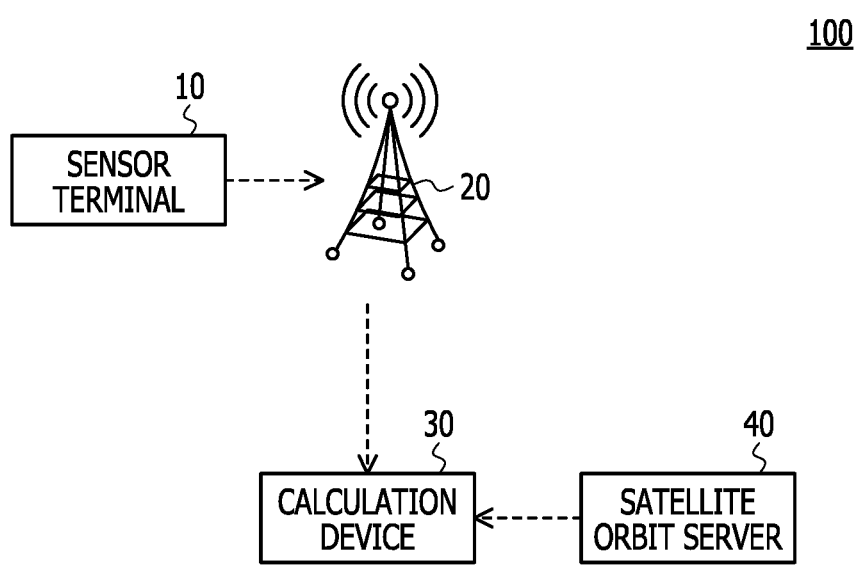
FIG. 2 is a block diagram illustrating a position detection system according to Example 1.

FIG. 2 is a block diagram illustrating a position detection system 100 according to Example 1. As illustrated in FIG. 2, the position detection system 100 includes a sensor terminal 10, a relay device 20, a calculation device 30, and the like.

Figure 3:
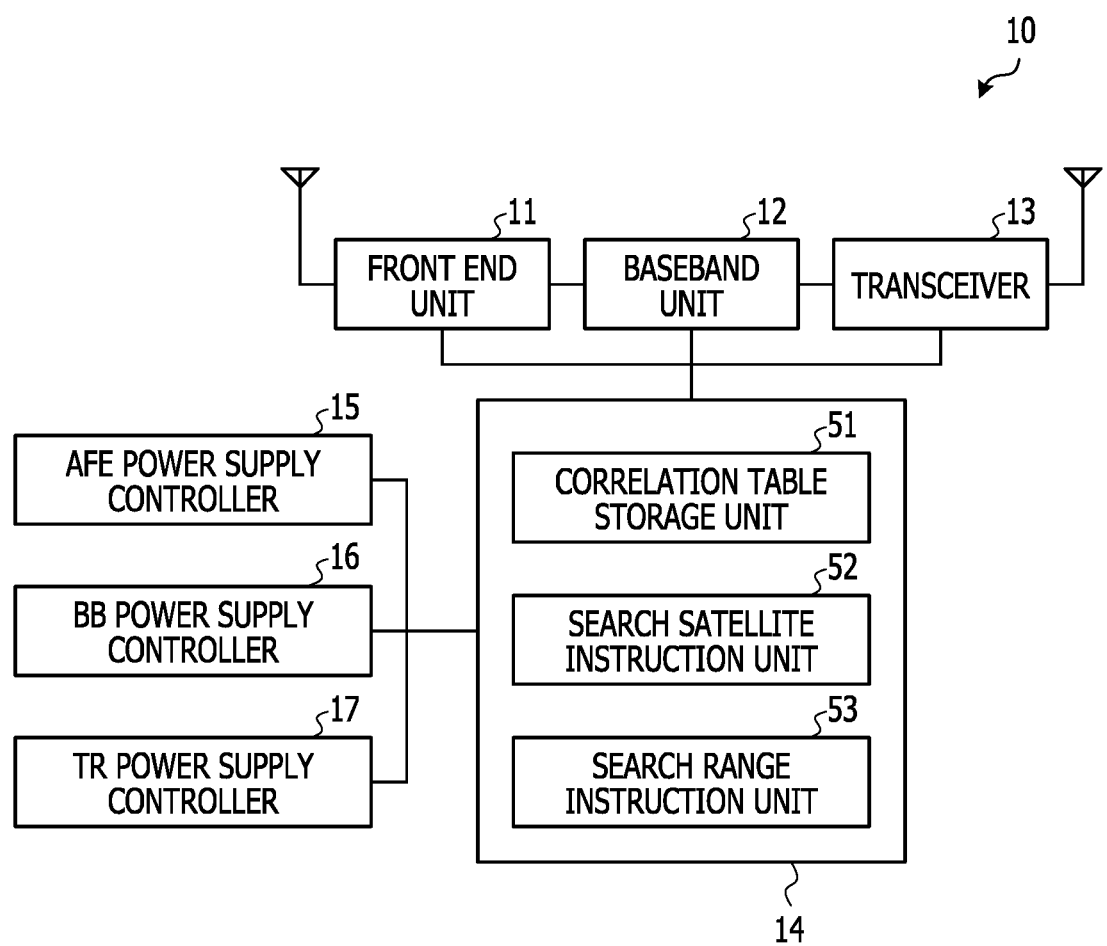
FIG. 3 is a block diagram illustrating a sensor terminal.

FIG. 3 is a block diagram illustrating the sensor terminal 10. The sensor terminal 10 is a GNSS sensor terminal. As illustrated in FIG. 3, the sensor terminal 10 includes a front end unit 11, a baseband unit 12, a transceiver 13, a control unit 14, an analog front end (AFE) power supply controller 15, a baseband (BB) power supply controller 16, a transceiver (TR) power supply controller 17, and the like. The control unit 14 includes a correlation table storage unit 51, a search satellite instruction unit 52, a search range instruction unit 53, and the like.

Figure 4:
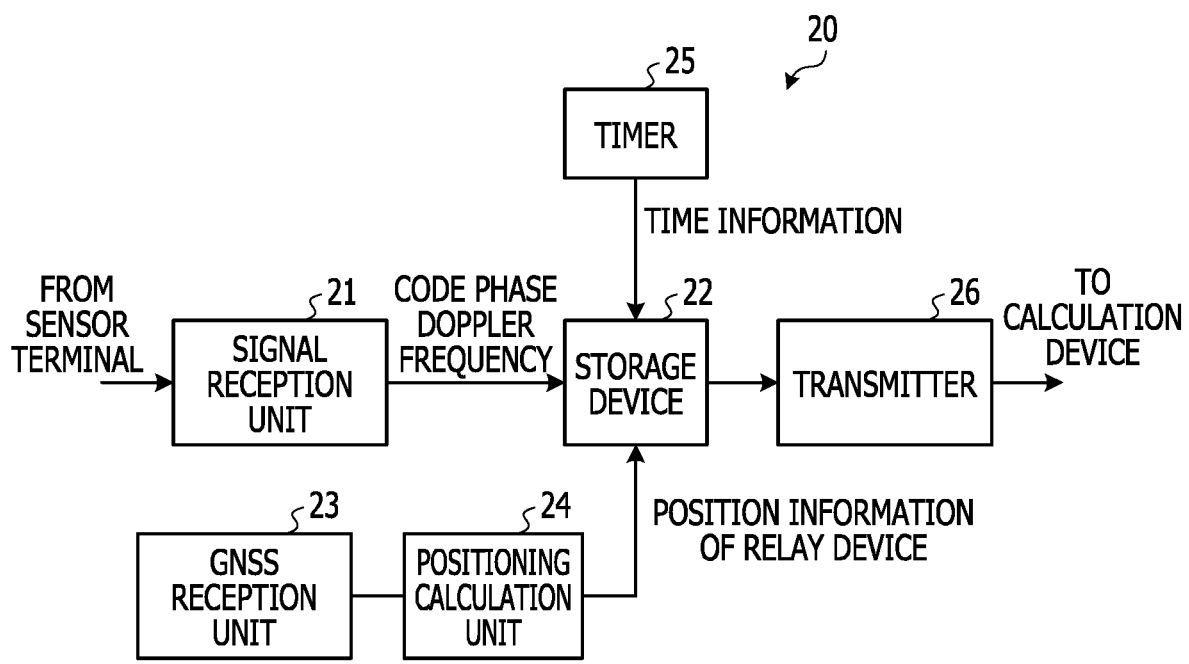
FIG. 4 is a block diagram illustrating a relay device.

FIG. 4 is a block diagram illustrating the relay device 20. The relay device 20 is a low-power wide-area (LPWA) base station, an access point, a gateway, or the like. As illustrated in FIG. 4, the relay device 20 includes a signal reception unit 21, a storage device 22, a GNSS reception unit 23, a positioning calculation unit 24, a timer 25, a transmitter 26, and the like. A plurality of relay devices 20 are provided. The relay devices 20 are respectively disposed at different locations.

The sensor terminal 10 transmits and receives signals wirelessly. The relay device 20 adds information such as its own position information to the snapshot GNSS signal received from the sensor terminal 10, and transmits the information to the calculation device 30. The relay device 20 may transmit a signal wirelessly, may transmit a signal by a wired manner, or may transmit a signal in a both wireless and the wired manner. The calculation device 30 uses the signal received from the relay device 20 to calculate an initial position of the sensor terminal 10.

First, the front end unit 11 has a function as an analog front end, receives the GNSS satellite signal from the GNSS satellite as a snapshot, and converts the received GNSS satellite signal into a digital IQ sample. The IQ sample is a signal obtained by down-converting the GNSS satellite signal from a frequency band of a radio frequency (RF) to a frequency band of an intermediate frequency (IF), passing through a band limiting filter, and then performing analog-to-digital conversion. The signal is called an IQ sample because it is down-converted with two orthogonal phases of I and Q.

The baseband unit 12 calculates raw data by baseband processing from the IQ sample received from the front end unit 11 and outputs the calculated raw data. The raw data is the code phase and the Doppler frequency obtained by performing the baseband processing (satellite capture processing) on the IQ sample obtained from the GNSS satellite signal. These two types of values are calculated as many times as the number of captured GNSS satellites. The code phase represents a small number component of a signal propagation delay, when the unit is 1 msec, from the GNSS satellite to the sensor terminal 10. The transceiver 13 wirelessly transmits the raw data output from the baseband unit 12 as the snapshot GNSS signal.

The AFE power supply controller 15 controls ON/OFF of the power supply of the front end unit 11 which functions as an analog front end. Thereby, the power consumption of the front end unit 11 other than a desired period may be suppressed. The BB power supply controller 16 controls power ON/OFF of the power supply of the baseband unit 12 for performing the baseband processing. Thereby, the power consumption of the baseband unit 12 other than a desired period may be suppressed. The TR power supply controller 17 controls ON/OFF of the power supply of the transceiver 13. Thereby, the power consumption of the transceiver 13 other than the desired period may be suppressed.

The signal reception unit 21 receives the raw data transmitted from the sensor terminal 10. The signal reception unit 21 extracts the code phase and the Doppler frequency included in the raw data, and causes the storage device 22 to store the code phase and the Doppler frequency. The GNSS reception unit 23 receives the GNSS satellite signal from the GNSS satellite. In this case, the GNSS reception unit 23 does not perform snapshot reception but receives both the integer value and the decimal value of the signal propagation time. The positioning calculation unit 24 uses the GNSS satellite signal received by the GNSS reception unit 23 to calculate the position of the relay device 20 and causes the storage device 22 to store the position. The timer 25 causes the storage device 22 to store time information (current time or the like). The storage device 22 stores the code phase and the Doppler frequency received from the signal reception unit 21 and the position of the relay device 20 received from the positioning calculation unit 24 in association with the time information received from the timer 25. For example, the storage device 22 adds the position information of the relay device 20 and the time information to the raw data. The transmitter 26 transmits the information stored in the storage device 22.

The calculation device 30 acquires satellite orbit information from the satellite orbit server 40 over a net such as NASA, and performs a positioning calculation together with the information transmitted from the relay device 20. In this positioning calculation, the calculation device 30 calculates the position of the sensor terminal 10 using the code phase and the Doppler frequency. In this case, a shadow location is left. However, in the present example, the calculation device 30 is able to narrow down the integer value of the GNSS signal to a correct value by using the position information of the relay device 20 that has received the snapshot GNSS signal from the sensor terminal 10 among positioning result candidates. For example, when a communication distance is about several km as in LPWA, it is possible to exclude a combination of integer values that generate the shadow location by acquiring which relay device 20 has received a signal from the sensor terminal 10. Accordingly, the calculation device 30 is able to estimate an initial position of the sensor terminal 10.

Figure 5:
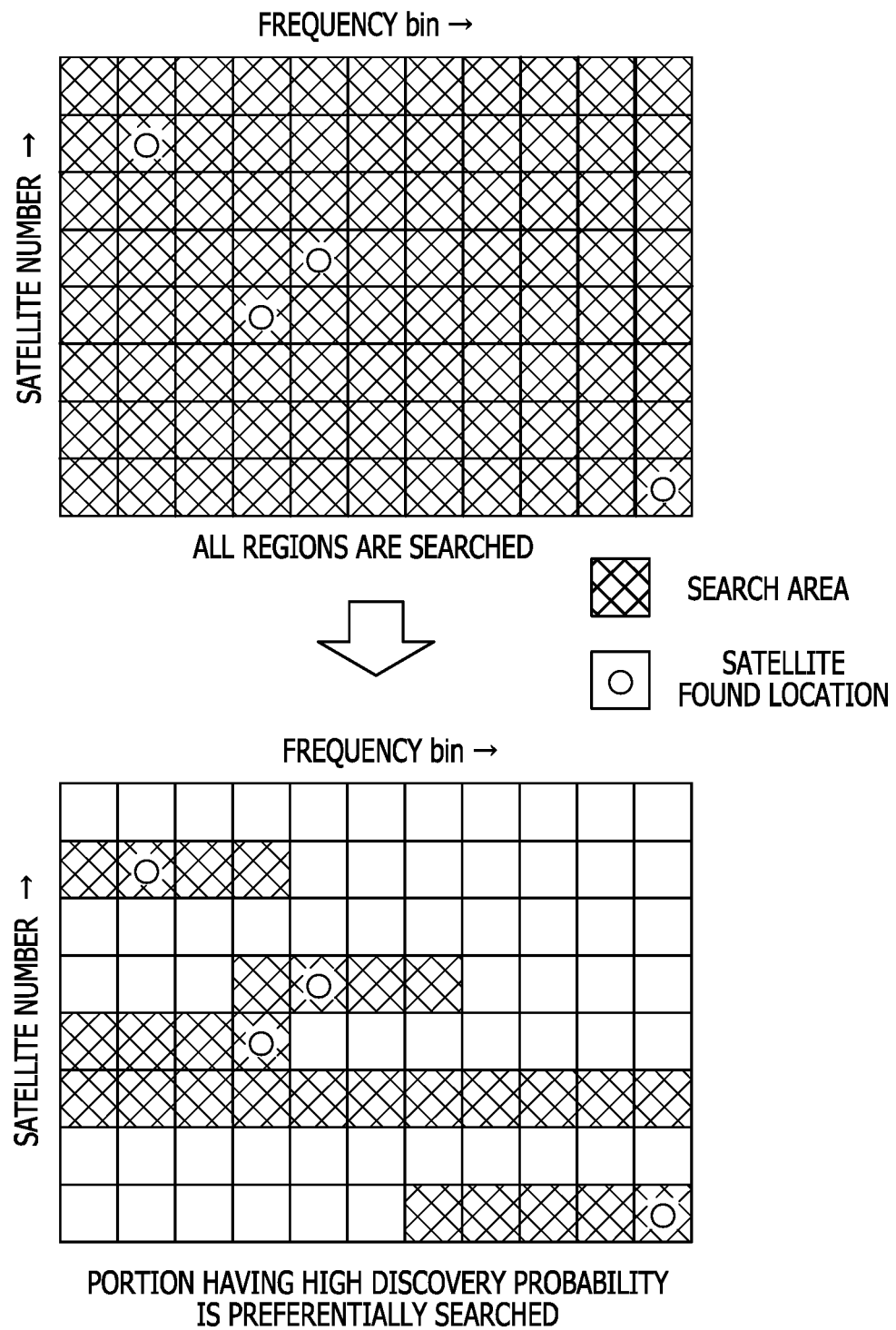
FIG. 5 is a diagram illustrating a satellite capture processing.

Next, an example of the satellite capture processing performed by the sensor terminal 10 will be described. The sensor terminal 10 determines the satellites of the search targets in order, and performs capture processing on satellite signals from the satellites of the search targets according to the order. Since the satellite relatively moves at a high speed such as 3.9 km/s relative to, for example, a ground surface, as illustrated in a top view of FIG. 5, it is conceivable to search for all frequencies bin for searching for each satellite. In FIG. 5, each shaded section represents each frequency bin that has been searched for each satellite. "◯" illustrates the frequency bin in which the satellite is captured. When searching is performed for all satellites, the amount of calculation increases. When all the frequencies bin are searched, the amount of calculation increases.

Therefore, as illustrated in a lower view of FIG. 5, if only the satellite having a high probability of being captured (discovery probability) is searched, the amount of calculation is reduced. Therefore, an algorithm for deriving a satellite having a next high discovery probability from the captured satellites is desired. If only a range of the frequency bin having a high probability of capturing the satellite is searched, the amount of calculation is further reduced.

Figure 6A:
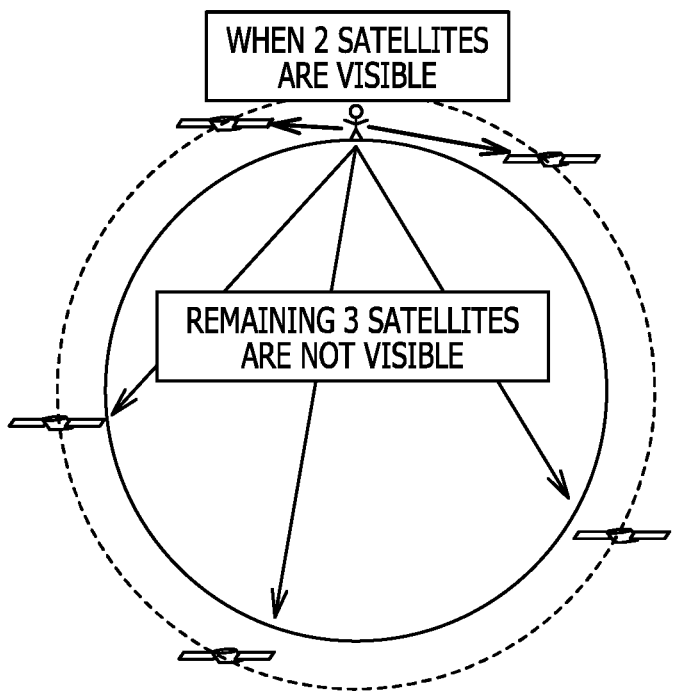
FIGS. 6A and 6B are diagrams illustrating a positional relationship of satellites.

All satellites are not captured at a ground point on the ground surface. For example, when 5 or more satellites revolve around over one orbit, a maximum number of satellites captured at a same time among the satellites over the orbit is about 3. For example, in the example of FIG. 6A, while 2 satellites are visible at the same time, the remaining 3 satellites are not visible. Therefore, it is preferable that the satellite that is not expected to be invisible is excluded from the search target.

Figure 6B:
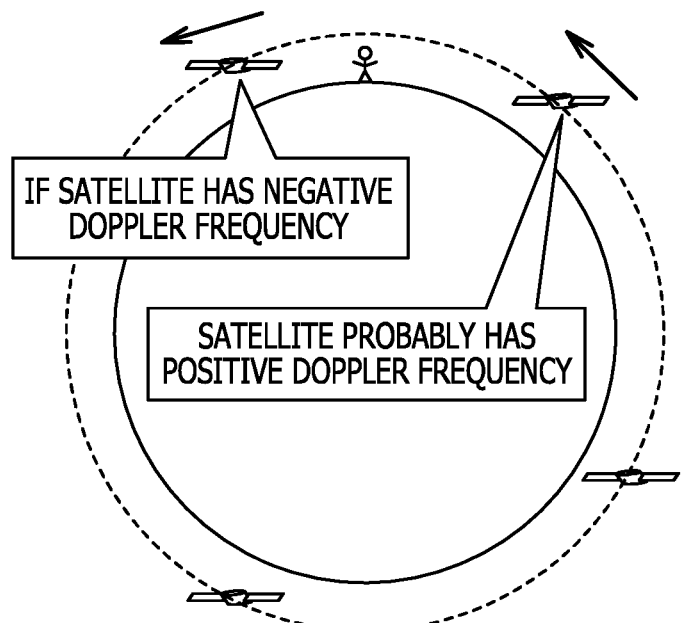

Since a relative positional relationship between each satellite is unchanged, the Doppler frequency is also predictable. In the example of FIG. 6B, if one satellite has a negative Doppler frequency, the other satellite is expected to have a positive Doppler frequency. Even for satellites located in a different orbit, because orbital cycles are close to each other, there is a correlation between positions.

As a method for reducing an initial fix time of the GNSS/GPS, there may be a technique of providing auxiliary information from the outside, and a technique of examining a satellite of which a relative position is near in accordance with a satellite which has been found by remembering the relative position of each satellite. However, in the present example, the sensor terminal 10 itself does not perform positioning, and the power supply is turned off when it is not desirable. Therefore, the sensor terminal 10 itself does not know where the sensor terminal itself is present and it does not know wat time the current time is. Satellite orbit information over a GPS broadcast signal may not be used. Data that may be captured are the code phase and the Doppler frequency of the captured satellite.

Figure 7:
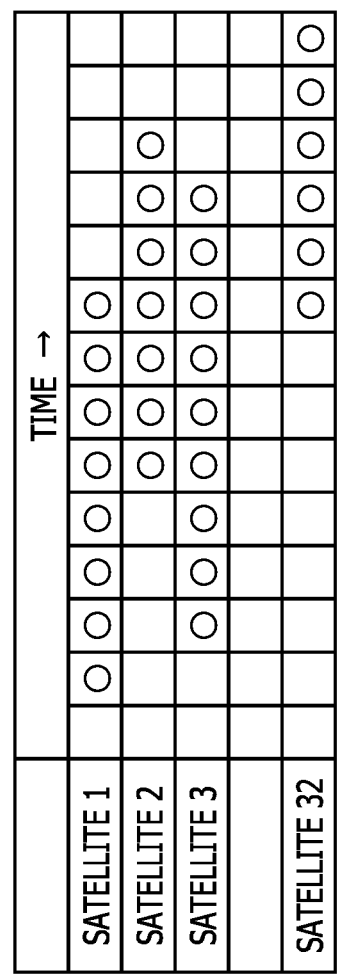
FIG. 7 is a diagram illustrating a time range in which a satellite is visible.

As a result of preprocessing, it is assumed that a satellite appears as illustrated in FIG. 7 at a certain ground point. A horizontal axis represents an elapsed time at a fixed time interval. Therefore, the more time it goes to the right, the later it becomes. The satellite 1 is captured at time of 8 points. The satellite 2 is captured at time of 7 points. The satellite 3 is captured at time of 9 points. The satellite 32 is captured at time of 6 points. These time points correspond to time periods.

4 points of the satellite 2 overlap with respect to 8 points of the satellite 1. In this case, a visible correlation coefficient $C_{1,2}$ of the satellite 2 for the satellite 1 is set to 4/8=0.5. Next, 4 points of the satellite 1 overlap with respect to 7 points of the satellite 2. In this case, a visible correlation coefficient $C_{2,1}$ of the satellite 1 for the satellite 2 is set to 4/7=0.57. In this way, $C_{m,n}$ represents a ratio of the number of overlap time points at which the satellite n is captured with respect to the number of times at which the satellite m is captured.

The correlation table storage unit 51 stores tables of the visible correlation coefficients. The visible correlation coefficient may be obtained by a previous calculation. The visible correlation coefficient may be created from the Doppler frequency table. The Doppler frequency table may also be obtained by a previous calculation.

Figure 8:
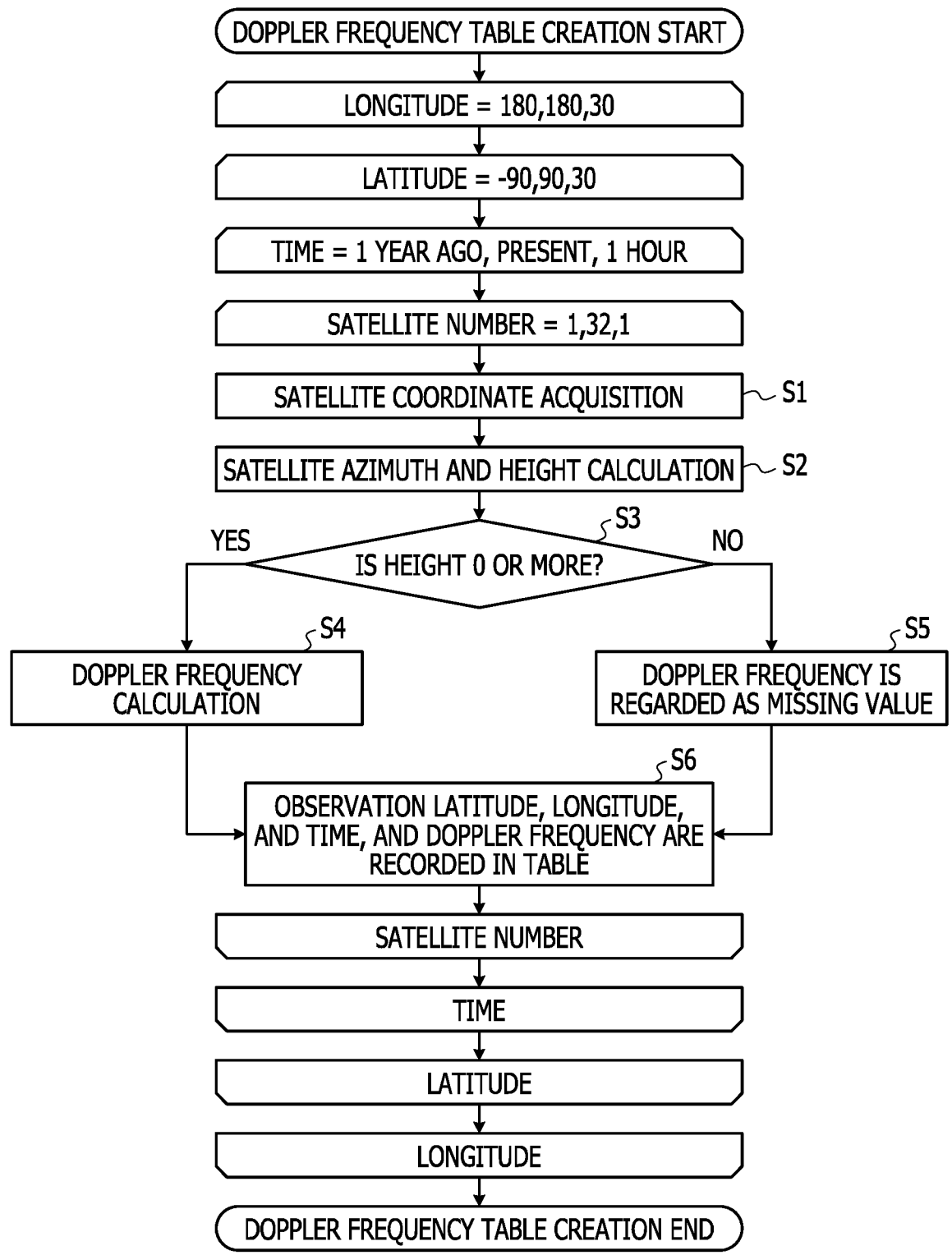
FIG. 8 is a diagram illustrating a flow of creating a Doppler frequency table.

FIG. 8 is a diagram illustrating a flow of creating the Doppler frequency table. As illustrated in FIG. 8, first, satellite orbit information is acquired from the satellite orbit server 40, and coordinates of the target satellite are acquired (step S1). Next, a satellite azimuth and a height of the satellite are calculated (step S2). Next, it is determined whether or not the height calculated in step S2 is equal to or greater than 0 (step S3). The height being equal to or greater than 0 means that the satellite is visible. If the height is not equal to or greater than 0, it means that the satellite is not visible.

When "Yes" in step S3, the Doppler frequency is calculated (step S4). When "No" in step S3, the Doppler frequency is regarded as a missing value (step S5). After the execution of step S4 or step S5, in the Doppler frequency table, the target satellite, the observation latitude and longitude, the observation time, and the Doppler frequency are recorded in association with each other (step S6). The step S1 to step S6 described above are repeatedly executed every 30° from the longitude −180° to +180°, and every 30° from the latitude −90° to +90°, at a designated time for every one hour from 1 year ago to the present from the satellite number 1 to 32. Thereby, it is possible to capture the Doppler frequency for each satellite at the designated time at each latitude and each longitude.

Figure 9:
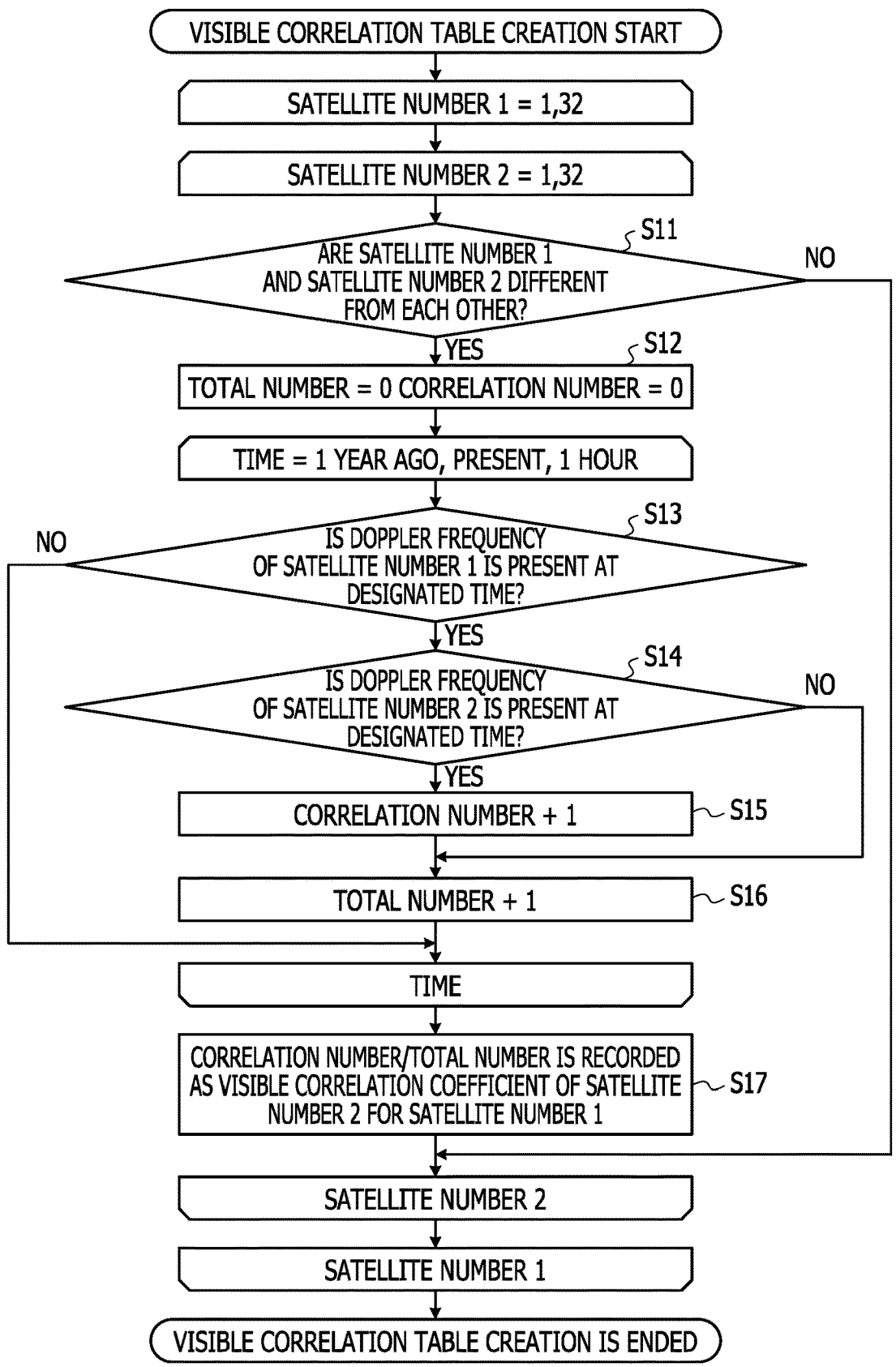
FIG. 9 is a diagram illustrating a flow of creating a visible correlation table.

FIG. 9 is a diagram illustrating a flow of creating a visible correlation table. As illustrated in FIG. 9, it is determined whether or not the satellite number 1 and the satellite number 2 are different from each other (step S11). The execution of step S11 may avoid the calculation of the visible correlation coefficient for the same satellite. When "Yes" is determined in step S11, the total number =0 is set, and the correlation number =0 is set (step S12).

Next, with reference to the Doppler frequency table, it is determined whether or not the Doppler frequency of the satellite number 1 is present at the designated time (step S13). When "Yes" is determined in step S13, with reference to the Doppler frequency table, it is determined whether or not the Doppler frequency of satellite number 2 is present at the designated time (step S14). When "Yes" is determined in step S14, 1 is added to the correlation number (step S15).

After the execution of step S15 or when "No" is determined in step S14, 1 is added to the total number (step S16). Step S13 to step S16 are repeated for every 1 hours from 1 years ago to the present for the designated time. Next, the correlation number/total number is recorded as the visible correlation coefficient of the satellite number 2 for the satellite number 1 (step S17). Step S11 to step S17 are repeated from 1 to 32 for the satellite number 1 and from 1 to 32 for the satellite number 2. Thereby, the visible correlation table including all visible correlation coefficients may be created. The visible correlation table is stored in the correlation table storage unit 51.

The search satellite instruction unit 52 refers to a visible correlation coefficient table stored in the correlation table storage unit 51 to instruct the baseband unit 12 the satellite number of the search target. For example, when determining the first search target, the search satellite instruction unit 52 calculates a discrimination degree $D_{sat}$ according to the following expression (1), and instructs the baseband unit 12 to search for the entire frequency bin of the satellite sat having the highest $D_{sat}$. In the following expression (1), sat represents the satellite number, and $C_{m,n}$ represent the visible correlation coefficient of the satellite n to the satellite m, and represent a ratio of the number of overlap time points at which the satellite n is captured to the number of time points at which the satellite m is captured.

$$D_{sat} = \sum_{i=1}^{32}(0.5 - C_{sat,i})^2$$

The more the visible correlation coefficient is away from 0.5, the higher the score is. For example, when the visible correlation coefficient is close to 1, the discovery probability of the satellite n is increased when the satellite m is found. On the other hand, when the visible correlation coefficient is close to 0, the discovery probability of the satellite n is decreased when the satellite m is found. In this way, the discrimination degree $D_{sat}$ is an index which is reflected larger as the discovery probability of other satellites is higher or lower, in a case where the first satellite is captured. By using the discrimination degree $D_{sat}$, the second and subsequent searches are easy to converge.

The discovery probability of the satellite n is assumed to be $S_n$. An initial value of the discovery probability $S_n$ is assumed to be 1. When the previously searched satellite m is found, the discovery probability is recalculated as $S_n = S_n \times C_{m,n}$. In this case, "n" represents all of the satellite numbers other than m. When the previously searched satellite m is not found, the discovery probability is recalculated as $S_n = S_n \times (1 - C_{m,n})$. Among the satellites which have not been searched up to now, a satellite having the highest $S_n$ is regarded as the next candidate.

Figure 10:
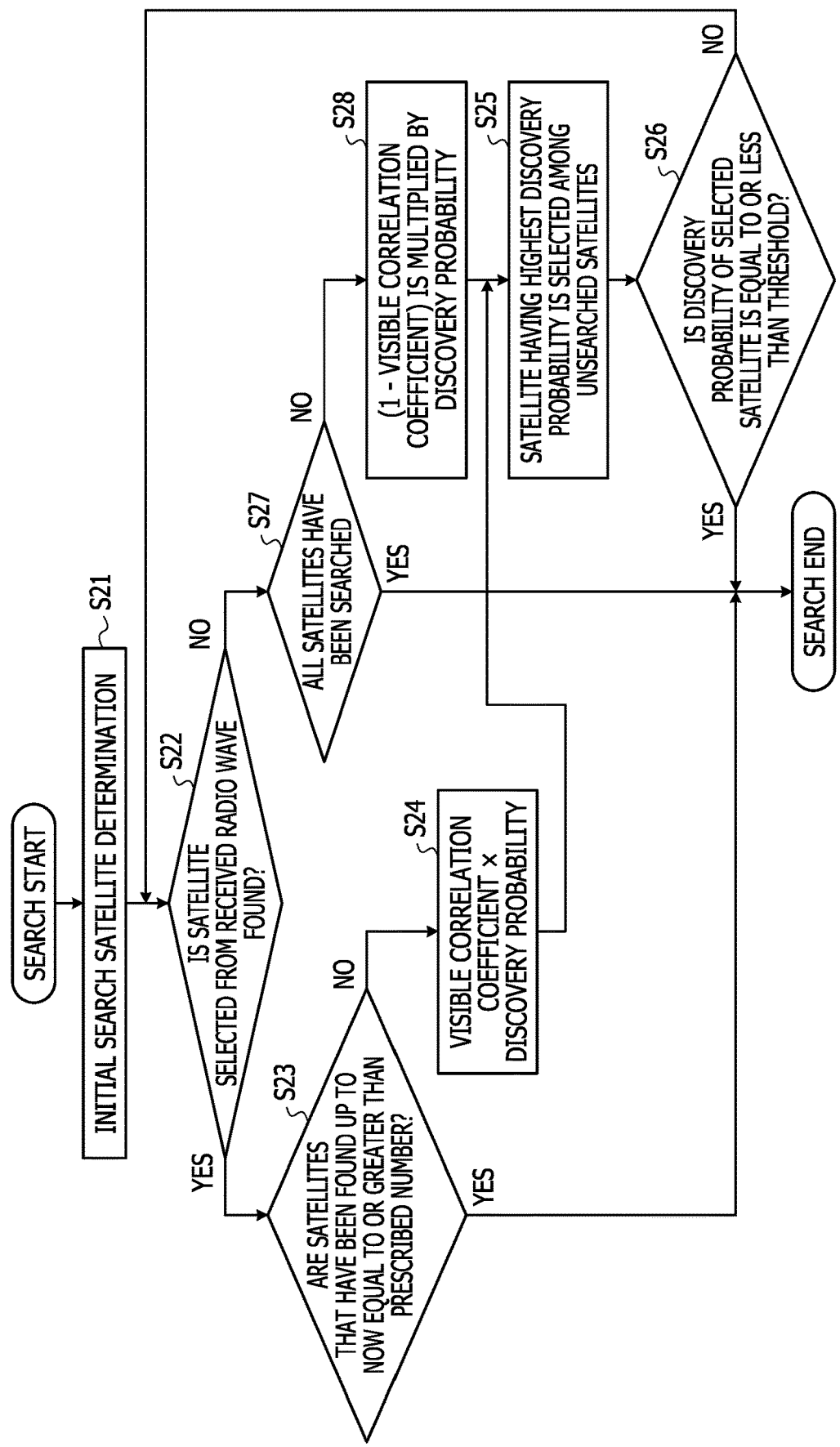
FIG. 10 is a diagram illustrating a flowchart in which an operation of a control unit is organized.

FIG. 10 is a diagram illustrating a flowchart in which the operation of the control unit 14 is organized. As illustrated in FIG. 10, the search satellite instruction unit 52 refers to the visible correlation table stored in the correlation table storage unit 51, and determines the initial search satellite as the first search target (step S21). In this case, the search satellite instruction unit 52 calculates the discrimination degree $D_{sat}$ in accordance with the expression (1), determines the satellite sat having the highest $D_{sat}$, and instructs the baseband unit 12 to capture the satellite.

Next, the search satellite instruction unit 52 determines whether or not the baseband unit 12 has captured the instructed satellite from the received radio wave (step S22). When "Yes" is determined in step S22, the search satellite instruction unit 52 determines whether or not the satellites captured up to now is equal to or greater than a predetermined number (for example, 8) (step S23). When "No" is determined in step S23, the search satellite instruction unit 52 multiplies the visible correlation coefficient by the discovery probability to obtain a new discovery probability (step S24). In this case, the search satellite instruction unit 52 recalculates the discovery probability as $S_n = S_n \times C_{m,n}$. "m" is the instructed satellite number, and "n" is all the satellite numbers other than "m".

Next, the search satellite instruction unit 52 selects a satellite having the highest discovery probability among the unsearched satellites (step S25). Next, the search satellite instruction unit 52 determines whether or not the discovery probability of the selected satellite is equal to or less than a threshold (for example, 0.05 or less) (step S26). When "Yes" is determined in step S26, the execution of the flowchart is ended. If "No" is determined in step S26, the execution is performed again from step S22. In this case, the search satellite instruction unit 52 instructs the baseband unit 12 to capture the selected satellite.

When "No" is determined in step S22, the search satellite instruction unit 52 determines whether or not all satellites have been searched (step S27). When "No" is determined in step S27, the search satellite instruction unit 52 multiplies (1−visible correlation coefficient number) by the discovery probability to obtain a new discovery probability (step S28). In this case, the search satellite instruction unit 52 recalculates the discovery probability as $S_n = S_n \times (1 - C_{m,n})$. "m" is the instructed satellite number, and "n" is all the satellite numbers other than "m". After that, step S25 is executed again. When "Yes" is determined in step S23, or when "Yes" is determined in step S27, the execution of the flowchart is ended.

According to the present example, when determining the first search target, an index which is reflected larger as the discovery probability of other satellites is higher or lower, in a case where the first satellite is captured, is used. In this case, the second and subsequent searches are likely to converge. For the second and subsequent search targets, a satellite having the highest discovery probability is determined based on a specific estimation method (for example, a Bayesian estimation method). In this case, it is possible to avoid searching for a satellite having a low discovery probability. As described above, according to the present example, the search range of the satellite may be narrowed down.

MODIFIED EXAMPLE

Based on the Doppler frequency from the satellite of the search target, a frequency range of a next search target may be determined, and a capture processing of the next search target may be performed within the frequency range. For example, as illustrated in FIG. 11, the time of 8 points captured by the satellite 1 may be divided into a plurality of stages, for example, 2 points at which the Doppler frequency is high, 4 points at which the Doppler frequency is medium, and 2 points at which the Doppler frequency is low. The time of 7 points captured by the satellite 2 may be divided into a plurality of stages, for example, 2 points at which the Doppler frequency is high, 3 points at which the Doppler frequency is medium, and 2 points at which the Doppler frequency is low.

A frequency correlation coefficient $Cx_{r1,n,r2,m}$ in each frequency range is calculated. The first (r1) and third (r2) of the subscript are Doppler frequency ranges (either high, medium, or low) of the each satellite. The second (n) of the subscript is a satellite other than the instructed satellite. The fourth (m) of the subscript is the instructed satellite. The satellite n searched to now is calculated according to the following expression (2), and the frequency range r2 having the highest Sx is regarded as the search target.

$$\sum_{n=1}^{32} Sx_{r2} = Sx_{r2} \times Cx_{r1,n,r2,sat}.$$

Figure 12:
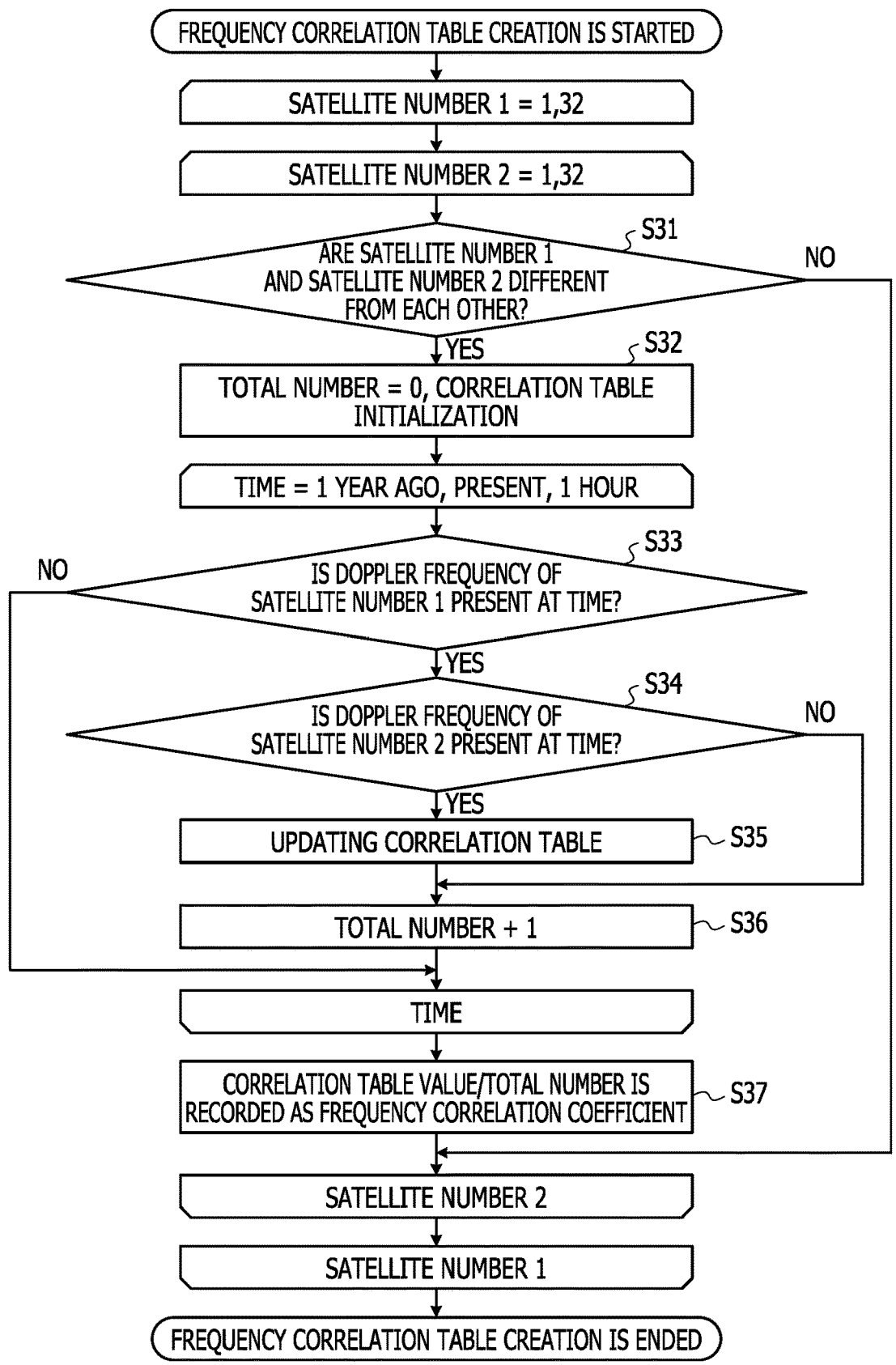
FIG. 12 is a diagram illustrating a flow of creating a frequency correlation table.

FIG. 12 is a diagram illustrating a flow of creating a frequency correlation table. As illustrated in FIG. 12, it is determined whether or not the satellite number 1 and the satellite number 2 are different from each other (step S31). When "Yes" is determined in step S31, the total number is set to 0, and the frequency correlation table ($T_{1,1}$ $T_{3,3}$) is initialized (step S32). Next, it is determined whether or not the Doppler frequency of the Doppler frequency 1 of the satellite number 1 is present at the designated time (step S33). When "Yes" is determined in step S33, it is determined whether or not the Doppler frequency of the satellite number 2 is present at the designated time (step S34). When "Yes" is determined in step S34, the frequency correlation table is updated (step S35). The update table is as illustrated in Table 1. Next, 1 is added to the total number (step S36). Step S33 to step S36 are repeatedly executed for every 1 hour from 1 years ago to the present.

TABLE 1

| Lower half | Intermediate | Upper half |
|---|---|---|
| $T_{1,1} + 1$ | $T_{1,2} + 1$ | $T_{1,3} + 1$ |
| $T_{2,1} + 1$ | $T_{2,2} + 1$ | $T_{2,3} + 1$ |
| $T_{3,1} + 1$ | $T_{3,2} + 1$ | $T_{3,3} + 1$ |

Next, the correlation number/total number is recorded as the frequency correlation coefficient of the satellite number 2 with respect to the satellite number 1 (step S37). $Cx_{satellite\ number1,1,\ satellite\ number2,1} = T_{1,1}$/total numbers. $Cx_{satellite\ number1,2,\ satellite\ number2,1} = T_{1,2}$/total numbers. $Cx_{satellite\ number1,3,\ satellite\ number2,1} = T_{1,3}$/total numbers. $Cx_{satellite\ number1,1,\ satellite\ number2,2} = T_{2,1}$/total numbers. $Cx_{satellite\ number1,1,\ satellite\ number2,2} = T_{2,2}$/total numbers. $Cx_{satellite\ numbers1,2,\ satellite\ numbers2,2} = T_{2,3}$/total numbers. $Cx_{satellite\ number1,3,\ satellite\ number2,2} = T_{2,3}$/total numbers. $Cx_{satellite\ number1,1,\ satellite\ number2,3} = T_{3,1}$/total numbers. $Cx_{satellite\ number1,2,\ satellite\ number2,3} = T_{3,2}$/total numbers. $Cx_{satellite\ number1,3,\ satellite\ number2,3} = T_{3,3}$/total numbers. Step S31 to step S37 are repeatedly executed from 1 to 32 for the satellite number 1, and from 1 to 32 for satellite number 2.

Figure 13A:
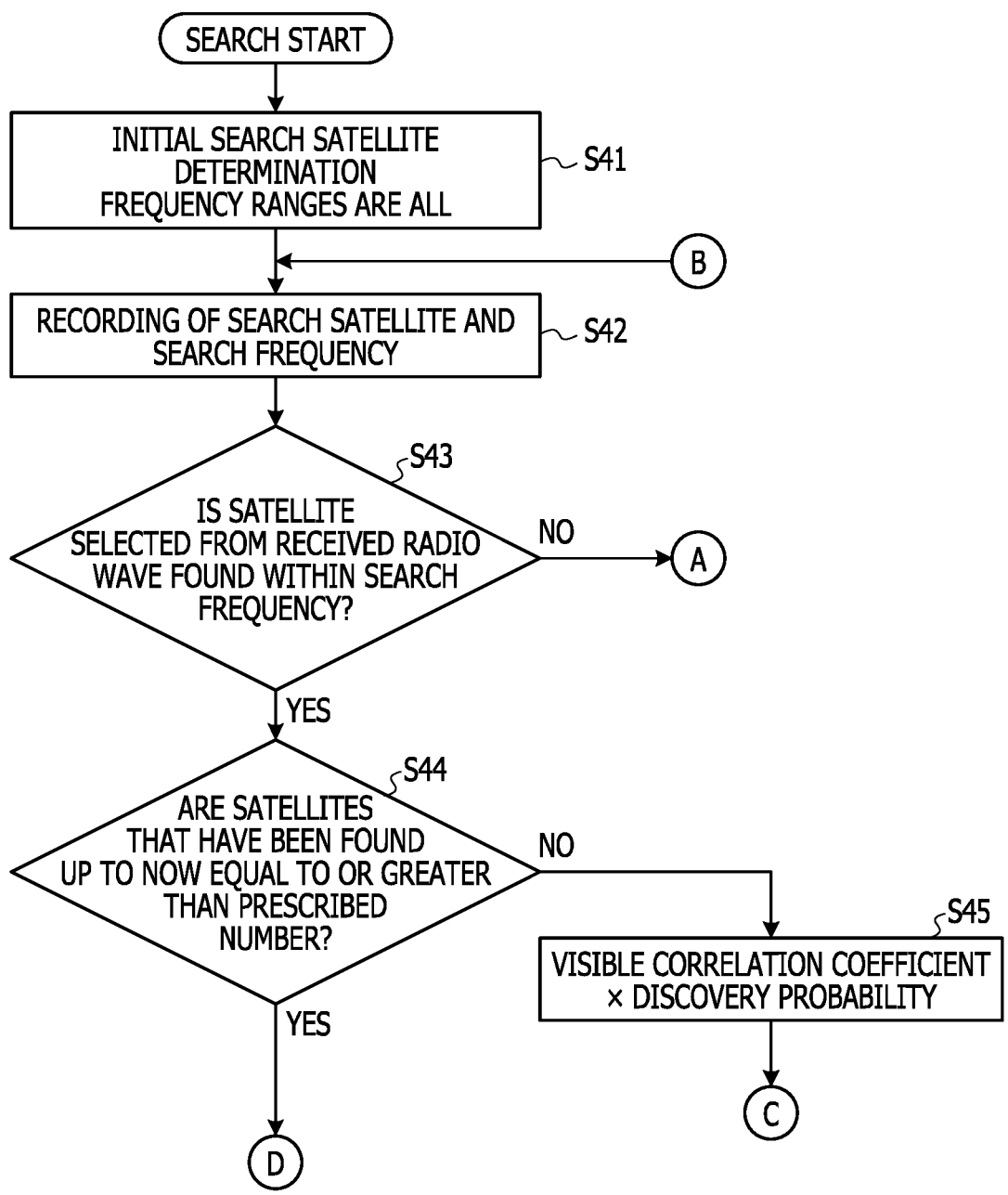
FIGS. 13A and 13B are a diagram illustrating a flowchart in which an operation of the control unit is organized.
Figure 13B:
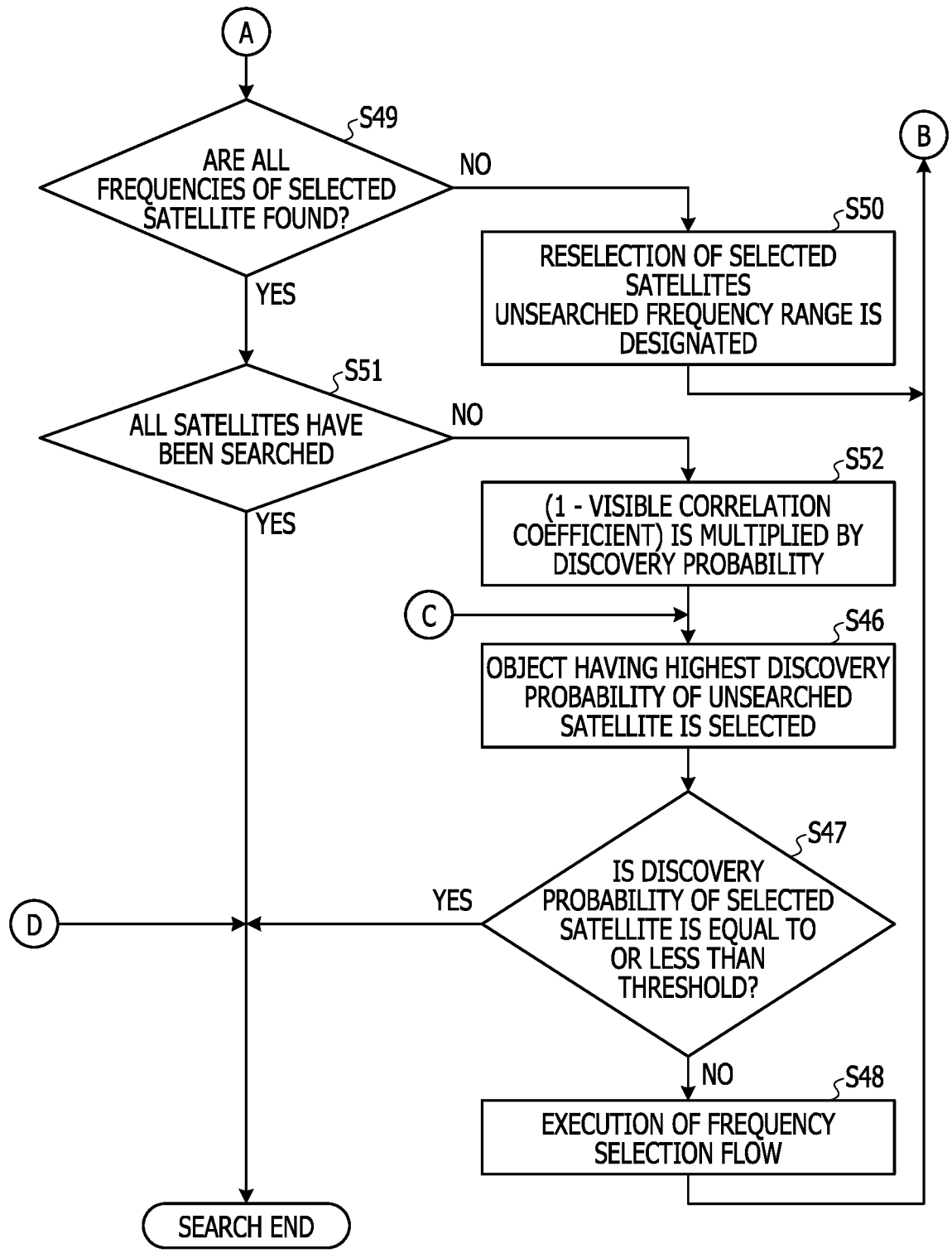

FIGS. 13A and 13B are a diagram illustrating a flowchart in which an operation of the control unit 14 is organized. As illustrated in FIGS. 13A and 13B, the search satellite instruction unit 52 refers to the visible correlation table stored in the correlation table storage unit 51 to determine the initial search satellite (step S41). In this case, the search satellite instruction unit 52 calculates the discrimination degree $D_{sat}$ in accordance with the expression (1), determines the satellite sat having the highest $D_{sat}$, and instructs the baseband unit 12 to search for the satellite as the search target. In this case, the search range instruction unit 53 sets the search frequency to all the frequency ranges.

Next, the search range instruction unit 53 records the search target and the search frequency (step S42). Next, the search satellite instruction unit 52 determines whether or not the baseband unit 12 has captured the satellite of the search target from the received radio wave (step S43). When "Yes" is determined in step S43, the search satellite instruction unit 52 determines whether or not the satellite captured up to now is equal to or greater than a predetermined number (for example, 8) (step S44). When "No" is determined in step S44, the search satellite instruction unit 52 multiplies the visible correlation coefficient by the discovery probability to obtain a new discovery probability (step S45). In this case, the search satellite instruction unit 52 recalculates the discovery probability as $S_n = S_n \times C_{m,n}$. "M" is the instructed satellite number, and "n" is all the satellite numbers other than "m".

Next, the search satellite instruction unit 52 selects a satellite having the highest discovery probability among the unsearched satellites (step S46). Next, the search satellite instruction unit 52 determines whether or not the discovery probability of the selected satellite is equal to or less than a threshold value (for example, 0.05 or less) (step S47). When "Yes" is determined in step S47, the execution of the flowchart is ended.

When "No" is determined in step 47, the search range instruction unit 53 executes the frequency selection flow (step S48). After that, the execution is performed again from step S42. In this case, the search satellite instruction unit 52 instructs the baseband unit 12 to capture the selected satellite. The search range instruction unit 53 instructs the baseband unit 12 to select the selected frequency range.

When "No" is determined in step S43, the search range instruction unit 53 determines whether or not all frequencies for the selected satellite have been searched (step S49). When "No" is determined in step S49, the search satellite instruction unit 52 reselects the selected satellite, and the search range instruction unit 53 designates the unsearched frequency range for the reselected satellite (step S50). After that, the execution is performed again from step S42.

When "Yes" is determined in step S49, the search satellite instruction unit 52 determines whether or not all satellites have been searched (step S51). When "No" is determined in step S51, the search satellite instruction unit 52 multiplies the (1−visible correlation coefficient) by the discovery probability to obtain a new discovery probability (step S52). After that, step S46 is executed again. When "Yes" is determined in step S44, or when "Yes" is determined in step S51, the execution of the flowchart is ended.

Figure 14:
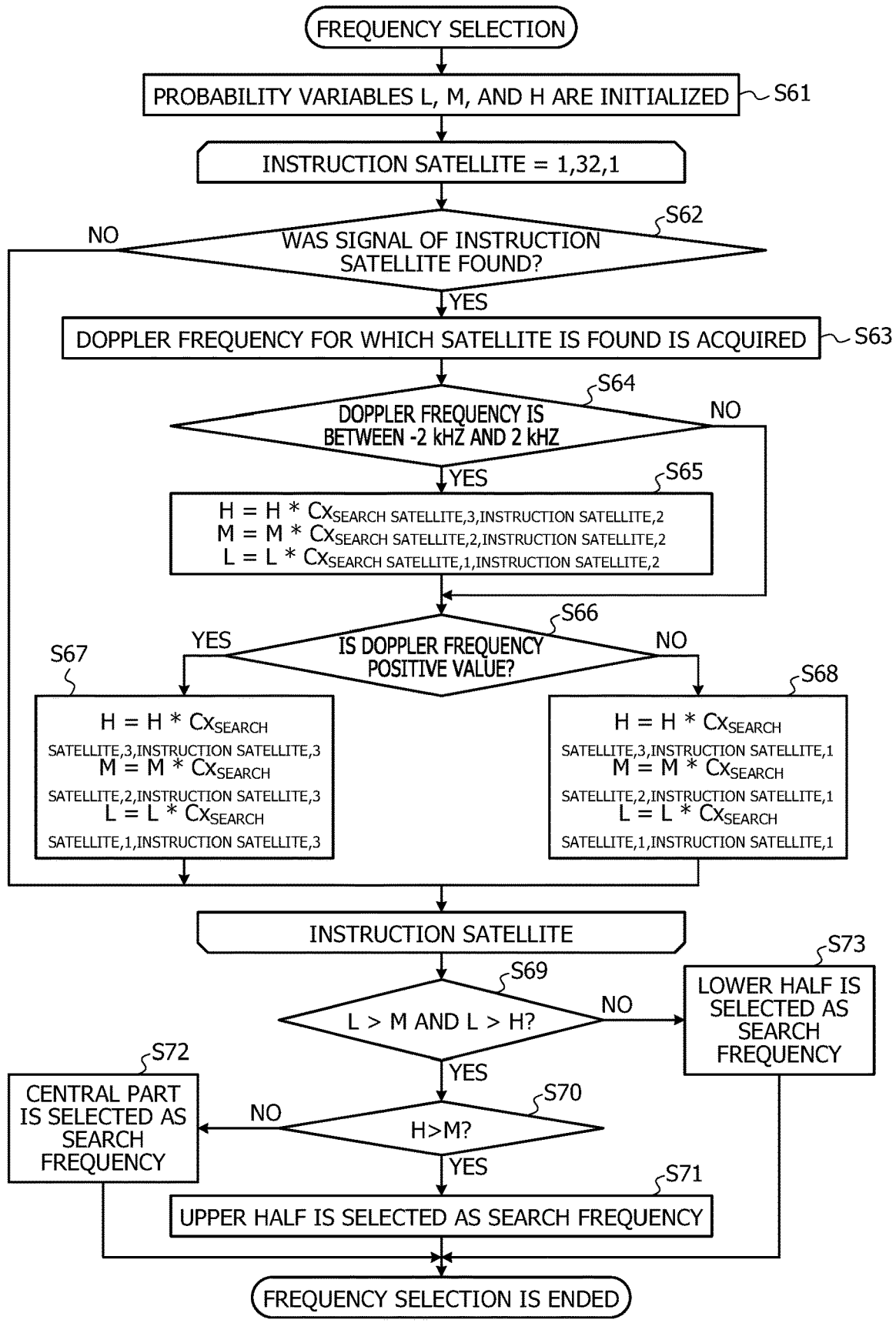
FIG. 14 is a diagram illustrating a frequency selection flow.

FIG. 14 is a diagram illustrating a frequency selection flow. As illustrated in FIG. 14, the search range instruction unit 53 initializes all of probability variables L, M, and H to 1 (step S61). Next, the search range instruction unit 53 determines whether or not the satellite signal of the instruction satellite has been found (step S62). When "Yes" is determined in step S62, the search range instruction unit 53 captures the Doppler frequency of the captured satellite (step S63). Next, the search range instruction unit 53 determines whether or not the Doppler frequency is from −2 kHz to +2 kHz (step S64). In this case, the search range instruction unit 53 may determine whether or not the absolute value of the Doppler frequency is equal to or less than the threshold value. When "Yes" is determined in step S64, the search range instruction unit 53 sets $H = H \times Cx_{search\ satellite,3,instruction\ satellite,2}$, sets $M = M \times Cx_{search\ satellite,2,instruction\ satellite,2}$, and sets $L = L \times Cx_{search\ satellite,1,instruction\ satellite,2}$ (step S65).

After the execution of step S65 or "No" is determined in step S64, the search range instruction unit 53 determines whether or not the Doppler frequency is a positive value (step S66). In this case, the search range instruction unit 53 may determine whether the absolute value which is a positive value of the Doppler frequency is a value equal to or greater than the threshold value, and whether the absolute value which is a negative value is equal to or greater than the threshold value. When "Yes" is determined in step S66, the search range instruction unit 53 sets $H = H \times Cx_{search\ satellite,3,instruction\ satellite,3}$, sets $M = M \times Cx_{search\ satellite,2,instruction\ satellite,3}$, and sets $L = L \times Cx_{search\ satellite,1,instruction\ satellite,3}$ (step S67). When "No" is determined in step S66, the search range instruction unit 53 sets the search satellite to be the $H = H \times Cx_{search\ satellite,3,instruction\ satellite,1}$, sets $M = M \times Cx_{search\ satellite,2,instruction\ satellite,1}$, and $L = L \times Cx_{search\ satellite,1,instruction\ satellite,1}$ (step S68). The search range instruction unit 53 repeatedly executes step S62 to step S68 from the instruction satellite=1 to 32.

Next, the search range instruction unit 53 determines whether L>M and L>H (step S69). When "Yes" is determined in step S69, the search range instruction unit 53 determines whether or not H>M (step S70). When "Yes" is determined in step S70, the search range instruction unit 53 selects the upper half as the search frequency (step S71). When "No" is determined in step S70, the search range instruction unit 53 selects the central portion as the search frequency (step S72). When "No" is determined in step S69, the search range instruction unit 53 selects the lower half as the search frequency (step S73). After executing any one of step S71 to step S73, the flowchart is ended.

According to the present modified example, the frequency range of the next search target is determined based on the Doppler frequency from the satellite of the search target, and the capture processing for the next search target is performed in the frequency range. Thereby, the frequency range is preferentially searched for from the frequency range to be easily captured. As a result, the amount of calculation may be reduced.

In the example described above, the second search target is captured after the capture processing of the first search target, but the second search target may be captured while the capture processing of the first search target is performed.

Similarly, in the second and subsequent search targets, the next search target may be captured while the capture processing of the previous search target is performed. In this way, an idle time may be reduced. Accordingly, the calculation time and power consumption may be suppressed.

In steps S28 and S52, although the (1−visible correlation coefficient) is multiplied by the discovery probability, the α (1−visible correlation coefficient) may be multiplied by the discovery probability. As α, it may use 0<α<1. In this manner, by performing weighting, it may reflect a case where the satellite is blocked in a building or the like even when the satellite is over a horizontal line.

In each of the examples described above, the sensor terminal 10 is an example of a sensor terminal for determining the satellite of the search target in order and transmitting a signal obtained by performing the capture processing on satellite signals from the satellite of the search target in accordance with the order. The calculation device 30 is an example of a calculation device for calculating a position of the sensor terminal based on a signal transmitted by the sensor terminal. The search satellite instruction unit 52 is an example of a satellite instruction unit that instructs the satellite of the search target in order. The baseband unit 12 is an example of a capture processing unit that performs the capture processing on the satellite signals from the satellite of the search target according to the order as instructed by the satellite instruction unit. The correlation table storage unit 51 is an example of a storage unit that stores, in advance, the discovery probability of other satellites in the case where the satellite of the search target is captured for each satellite. The search range instruction unit 53 is an example of a range instruction unit that instructs the frequency range of the next search target based on a Doppler frequency from the satellite of the search target.

Although the examples of the present disclosure have been described above in detail, the present disclosure is not limited to such particular examples and may be variously modified and changed within the scope of the gist of the present disclosure described in claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A position detection system comprising:
   a sensor terminal including a first memory and a first processor coupled to the first memory; and
   a calculation device including a second memory and a second processor coupled to the second memory;
   wherein
   the first processor is configured to determine satellites of search targets in order and transmit a signal obtained by performing capture processing for a satellite signal from the satellite of the search target in accordance with the order,
   the second processor is configured to calculate a position of the sensor terminal based on the transmitted signal,
   the first processor is configured to determine a satellite having a highest discovery probability based on a specific estimation method for second and subsequent search targets, using an index which is reflected larger as the discovery probability of other satellites is higher or lower, in a case where the first satellite is captured when a first search target is determined, and
   the first processor is further configured to store, in advance, the discovery probability of the other satellites when the satellite of the search target is captured for each satellite, and determine the second and subsequent search targets using the stored discovery probability.

2. The position detection system according to claim 1, wherein the discovery probability is a ratio of time periods during which other satellites are captured to a time period when the satellite of the search target is captured for each satellite.

3. The position detection system according to claim 1, wherein the first processor is configured to:
   instruct a frequency range of a next search target based on a Doppler frequency from the satellite of the search target, and
   perform capture processing of the next search target in a frequency range.

4. The position detection system according to claim 1, wherein the first processor is configured to output a code phase and a Doppler frequency of the satellite of the search target from a satellite signal snapshot- received from the satellite of the search target.

5. A sensor terminal comprising:
   a first memory; and
   a first processor coupled to the first memory and the first processor configured to:
   instruct a satellite of a search target in order,
   perform a capture processing for a satellite signal from the satellite of the search target according to the order,
   determine a satellite having a highest discovery probability based on a specific estimation method for second and subsequent search targets, using an index which is reflected larger as the discovery probability of other satellites is higher or lower, in a case where the first satellite is captured when a first search target is determined,
   store, in advance, the discovery probability of the other satellites when the satellite of the search target is captured for each satellite, and
   determine the second and subsequent search targets using the stored discovery probability.

6. The sensor terminal according to claim 5, wherein the discovery probability is a ratio of time periods during which other satellites are captured to a time period when the satellite of the search target is captured for each satellite.

7. The sensor terminal according to claim 5, wherein the first processor is configured to:
   instruct a frequency range of a next search target based on a Doppler frequency from the satellite of the search target, and
   perform capture processing of the next search target in a frequency range.

8. The sensor terminal according to claim 5, wherein the first processor is configured to output a code phase and a Doppler frequency of the satellite of the search target from a satellite signal snapshot- received from the satellite of the search target.

9. A position detection method to be executed by a computer, the position detection method comprising:
   transmitting, by a sensor terminal, a signal obtained by performing capture processing on a satellite signal from a satellite of a search target according to an order of the satellites of the search targets;

calculating, by a calculation device, a position of the sensor terminal based on a signal transmitted by the sensor terminal;

determining a satellite having a highest discovery probability based on a specific estimation method for second and subsequent search targets, using an index which is reflected larger as the discovery probability of other satellites is higher or lower, in a case where the first satellite is captured when a first search target is determined, and storing, in advance, the discovery probability of the other satellites when the satellite of the search target is captured for each satellite, and determining the second and subsequent search targets using the stored discovery probability.

* * * * *